*INVENTORS.*
BELDON A. PETERS,
ELVIS RICH,
LOUIS A. CARLTON,
BY
*ATTORNEY.*

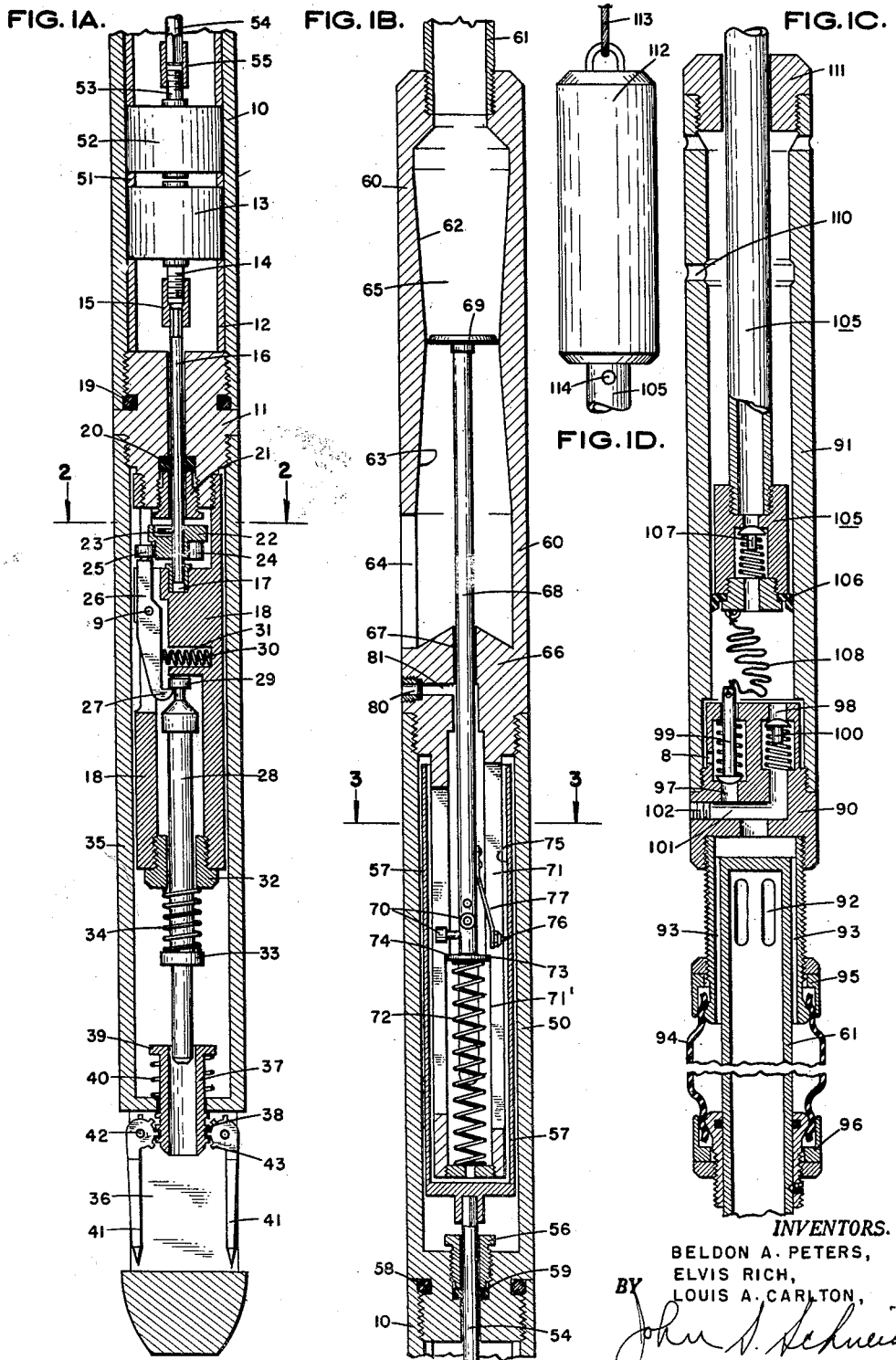

3,176,304
SUBSURFACE FLOWMETER
Beldon A. Peters, Elvis Rich, and Louis A. Carlton, Houston, Tex., assignors, by mesne assignments, to Jersey Production Research Company, Tulsa, Okla., a corporation of Delaware
Filed Oct. 16, 1961, Ser. No. 145,094
5 Claims. (Cl. 346—33)

The present invention broadly concerns apparatus for measuring rates and directions of flow of well fluids. In its more particular aspects, the invention concerns an improved self-contained subsurface fluid flow recorder designed to record down-the-hole detected directions and rates of flow of well fluids. Also, an aspect of the invention is an improved packer inflate pump for inflating and for permitting deflation of an expansible well packer.

Each of the several known ways to measure the direction and rate of flow of fluid in well bores has some disadvantageous characteristics. Available techniques which utilize radioactive tracers or split flow require special preparation of the well, e.g., the pulling of tubing, etc. Other available flow measuring instruments require the use of electrical conductor cables for transmitting the fluid flow information to the earth's surface for recordation and because of this are costly to operate, and in addition their use is limited to wells having relatively low surface pressures.

A primary object of the present invention, therefore, is to provide flowmeter instrumentation for measuring and recording directions and rates of flow of well fluids in a borehole which can be run through tubing on a single nonconducting wireline and which measures and records within itself the fluid flow information.

Briefly, the apparatus comprises fluid flow responsive means coupled to a recording assembly and means for diverting well fluids past the flow responsive means. When the means for diverting the fluid flow comprises an inflatable packer, a packer inflate pump is employed to pump well fluid into the packer to expand it. The pump is operated by reciprocation of the wireline suspending the instrumentation in the well while anchoring means maintains the instrument in position and prevents its downward movement.

The above object and other objects and advantages of the invention will be apparent from a more detailed description of the invention when taken in conjunction with the drawings wherein:

FIGS. 1A to 1D are vertical, partly-sectional views of the flowmeter apparatus of the invention including an expansible packer, a pump for expanding the packer and anchoring means for securing the apparatus in the borehole;

For a more complete description of the elements and operation of the invention, reference to the drawings in greater detail will now be made.

From bottom to top, the flowmeter includes a section for anchoring the instrument in the borehole, FIG. 1A; a flow responsive and flow recording section, FIG. 1B; a packer and packer inflate section, FIG. 1C; and a weight and suspension section, FIG. 1D.

Figure 2:
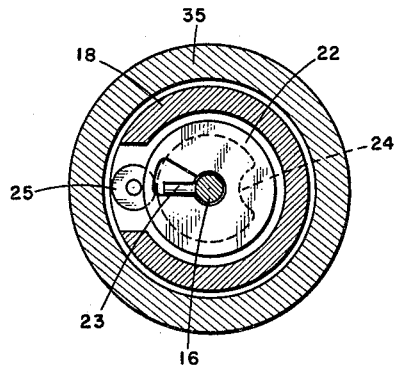
FIG. 2 is a view taken on lines 2—2 of FIG. 1A.

Breaking down the different sections in their components, in FIG. 1A is shown a cylindrical casing 10 threadedly connected to a plate member 11. A cylindrical sleeve 12 sits on top of plate member 11 and supports a clock timer motor 13, which is provided with an output drive shaft 14. A sleeve 15 couples output shaft 14 to a cam drive shaft 16, which extends through plate member 11 and terminates in a sleeved recess 17 formed in a nipple 18. Access of well fluids to the underside of clock timer motor 13 is prevented by seal 19 positioned between casing 10 and plate member 11 and seal 20 positioned between plate member 11, shaft 16 and a bearing 21 threadedly connected to plate member 11. A cam 22 is coupled to shaft 16 by a pin 23. As seen more clearly in FIG. 2, cam 22 has a substantially constant radius for most of its surface but is provided at one place with a recessed portion 24. A cam follower 25 rides on the cam surface and is affixed to the upper end of a sear 26, which is pivotally connected to nipple 18 by a pin member 9. The lower end of sear 26 forms a hook 27, which in one position of sear 26 and one position of a longitudinally movable rod 28 engages the underside of a flange 29 mounted on the upper end of rod 28 to maintain rod 28 in its uppermost position. A spring 30 is arranged in a recess 31 formed in nipple 18 and acts against the lower portion of sear 26 to urge hook 27 in a counterclockwise release direction. A guide nut 32 is threadedly connected to the lower end of nipple 18. Rod 28 is provided with a lower flange 33, and a spring 34 arranged on rod 28 between nut 32 and flange 33 urges rod 28 downwardly. Nipple 18 is incased in a housing 35, which is threadedly connected to plate member 11 at its upper end and provided with longitudinally extending slots 36 adjacent the lower end thereof. A movable sleeve 37, provided on its lower end with racks 38 and on its upper end with a shoulder 39, is arranged in housing 35. A spring 40 surrounds sleeve 37 and urges it upwardly. A plurality of dogs 41 are pivotally connected to housing 35 by means of pins 42 and are provided with teeth 43, which engage with racks 38. Dogs 41 pivot outwardly through slots 36 in housing 35.

Figure 3:
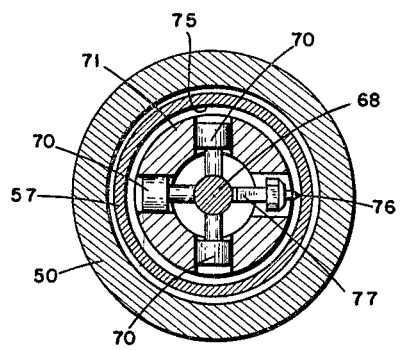
FIG. 3 is a view taken on lines 3—3 of FIG. 1B.

As seen in FIG. 1B, casing 10 threadedly connects at its upper end with the lower end of a recording assembly case 50. Referring back to FIG. 1A, at its upper end is shown a cylindrical sleeve 51 separating clock timer 13 and a chart drum clock timer 52. The output shaft 53 of timer 52 is coupled to a chart drum drive shaft 54 by means of a sleeve 55. Shaft 54, as seen in FIG. 1B, extends upwardly through the lower end of case 50 and through a bearing 56 connected to it and is splined at its upper end to the lower end of a cylindrical chart drum 57. Access of well fluids to above timer 52 is prevented by a seal 58 between case 50 and casing 10 and also by a packing gland seal 59 arranged in a recess below bearing 56 in the lower end of case 50. The upper end of case 50 threadedly connects to the lower end of an elongated housing or barrel 60, the upper end of which threadedly connects to a packer mandrel 61. The upper interior surface 62 of barrel 60 tapers downwardly and inwardly, and the lower interior surface 63 of barrel 60 tapers inwardly and upwardly. Below the lower tapered portion 63, barrel 60 is provided with ports 64 for ingress and egress of well fluids to or from the flow chamber 65 provided by tapered surfaces 62 and 63. The lower end 66 of barrel 60 forms a bushing 67 through which a float shaft 68 extends. The upper end of float shaft 68 has arranged on it a float 69 movable upwardly and downwardly, depending upon the direction of fluid flow through flow path 65. The lower end of float shaft 68 extends into recording case 50 and chart drum 57, and as seen more clearly in FIG. 3, a plurality of rollers 70 are connected to shaft 68 and ride in slots formed in a slotted cylindrical section 71 arranged within chart drum 57. A spring 72 is positioned within slotted section 71 and is provided on its upper end with a flat plate 73. Slotted section 71 is indented a portion of its length as indicated at 71', and the shoulders 74 formed thereby act as a stop to prevent upward movement of plate 73 under the bias of spring 72. A chart 75 is mounted on the inner wall of chart drum 57, and a stylus 76 is connected to shaft 68 via a spring arm 77. A screened weep hole 80 is formed in the lower end of barrel 66, and it fluidly communicates with the interior of chart drum 57 via a passage 81.

Referring to FIG. 1C, packer mandrel 61 at its upper end threadedly connects to the lower end of a valve nipple 90, which in turn threadedly connects to the lower end of a pump cylinder 91. The upper end of packer mandrel 61 is provided with ports 92 for ingress and egress of well fluids. Additional isolated passageways 93 fluidly communicate at their lower ends with the interior of a fluid expansible sleeve packer 94, which is secured to the mandrel at its upper and lower ends by end plates 95 and 96, respectively. The upper ends of passageways 93 fluidly communicate with the interior of cylinder 91 through two openings 97 and 98, which are normally maintained closed by means of check valves 99 and 100, respectively. A drain passage 101 in nipple 90 also communicates with passageways 93 and is closed by means of a plug 102. An additional opening 8 in nipple 90 above opening 97 also fluidly communicates with the interior of cylinder 91. A hollow piston 105 is provided at its lower end with a piston seal 106 and a check valve 107 normally closing off upward flow through the interior of piston 105. A drain valve cable 108 connects the underside of piston 105 and drain check valve 99. Cylinder 91 is provided with ports 110 adjacent the upper end thereof. Piston 105 extends upwardly through head 111 of cylinder 91 and connects to a weighted section 112 to which is connected a non-electrically conductive solid wireline 113. Below weighted section 112, piston 105 is provided with ports 114.

Figure 4:
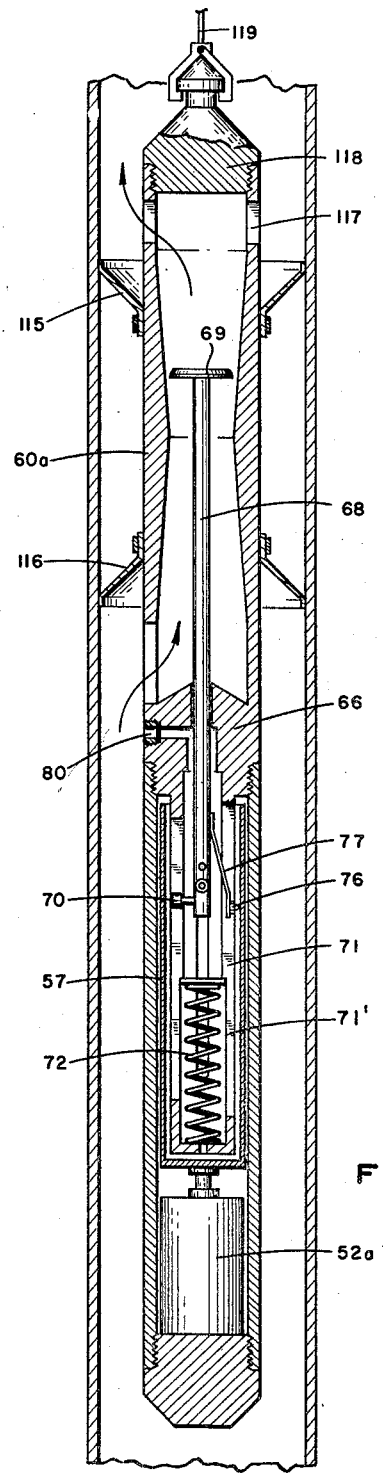
FIG. 4 is a vertical view, partly in section, showing essentially the flowmeter of FIG. 1B in conjunction with cup-type packers for diverting fluid flow through the flow responsive means instead of an expansible packer.

The flow measuring and flow recording apparatus shown in FIGS. 1A and 1B is substantially the same as that shown in FIG. 4. In FIG. 4, however, upper and lower resilient cup-shaped flow diverters 115 and 116 are mounted on a barrel 60a, which is the same as barrel 60, except upper ports 117 are provided above upper flow diverter 115 and a suitable head 118 for supporting the flowmeter in the borehole on a wireline 119 are shown.

The flowmeter of FIG. 1A to FIG. 3 operates in the following manner. All of the sections, the anchoring section, the flow measuring and recording section, the packer section, the pump section and the weighted section are lowered in a well bore on solid wireline 113. When the lowest depth at which it is desired to measure and record rates and direction of fluid flow in the well is reached, dog release timer 13 actuates and rotates output shaft 14, which in turn rotates cam drive shaft 16. Rotation of cam 22 through rotation of cam drive shaft 16 causes recessed portion 24 of cam 22 to engage cam rider 25 and permits sear 26 to pivot under the urging of spring 30 to move the lower end outwardly and disengage hook 27 from flange 29. Unrestrained rod 28 moves downwardly under the bias of spring 34 until lower flange 33 engages shoulder 39 of sleeve 37 and moves sleeve 37 downwardly against the bias of spring 40. This causes dogs 41 to pivot outwardly through the interconnecting rack and teeth of sleeve 37 and dogs 41, respectively. Dogs 41 pivot outwardly through slot 36 in housing 35 and anchor the instrument in the well.

Once the instrument is secured against further downward travel by setting of dogs 41, tension is released on wireline 113, and weighted section 112 forces piston 105 to move downwardly inside cylinder 91. This movement of piston 105 causes piston seal 106 to expand against the inner wall of cylinder 91, thereby forcing fluid trapped between check valves 107 and 100 to be moved through passage 98, past check valve 100 and into packer passageways 93, which lead to the interior of expansible packer 94. When piston 105 reaches the bottom of its travel, tension is again applied to wireline 113, and weighted section 112 and piston 105 are moved upwardly and returned to a position slightly less than the fully extended position of the piston, which lies above ports 110 but insufficiently far to extend drain valve cable 108 to the point where drain valve 99 opens. Upward movement of weighted section 112 and piston 105 causes well fluids surrounding the instrument to flow through ports 114 and through check valve 107 into cylinder 91. Then tension on wireline 113 is again released, and the procedure is repeated. This operation may be repeated until the pressure inside packer 94 is equal to the pressure created by weighted section 112 acting over the cross-sectional area of piston seal 106. When this point is reached, weighted section 112 will not force piston 105 down.

When it is necessary to drain fluid from packer 94, sufficient tension is applied to wireline 113 to lift weighted section 112 and piston 105; and when piston 105 has reached its maximum upward travel, tension is applied to drain valve cable 108, thereby lifting drain valve 99 off its seat and permitting fluid within packer 94 to exit from it through valve 99 and port 9 and up through cylinder 91 and out ports 110.

Once the packer is inflated and has sealed off the space surrounding the instrument between ports 92 and 64, well fluids pass through the interior of tapered barrel 60 and displace float 69 upwardly or downwardly, depending upon the direction of fluid flow. Float 69 supported by shaft 68, which is in turn supported by spring 72 and guided by bushing 67 and rollers 70 traveling in the slots of slotted section 71 to prevent rotation of shaft 68, moves upwardly or downwardly, depending upon the direction of flow. Stylus 76 indicates vertical displacement of float 69 by recording on chart 75, which is rotated by chart drum 57, which in turn is rotated by shaft 54, which is driven by clock timer motor 52 through its output shaft 53. Screened weep hole 80 and its communicating passageway 81 permits well fluids to enter or leave the recording assembly case 50 upon vertical movement of shaft 68. As previously mentioned, packing gland 59 and seal 58 prevent well fluids from reaching chart drum motor 52.

The embodiment of FIG. 4 operates in a similar manner insofar as the measuring and recording mechanism is concerned, but instead of using expansible packer 94 to seal off fluid flow, flow diverters 115 and 116 are used to divert the flow.

Having fully described the objects, elements, and operation of our invention, we claim:

1. Apparatus suspendible in a well on a non-conductor wire line including a flow meter for detecting and recording the rate and direction of fluid flow in a well bore comprising an elongated housing having upper and lower ports for permitting well fluids to flow through said housing, the interior wall of said housing being tapered inwardly in a downward direction in the upper portion thereof and inwardly in an upward direction in the lower portion thereof to define two variable area upper and lower sections, the smallest cross-sectional area being located between the upper and lower sections; a float arranged in said housing longitudinally movable in response to the flow of well fluids upwardly and downwardly through said housing; a shaft connected to said float and movable therewith; a rotatable chart drum; a recording chart mounted on the interior of said drum; guide means arranged within said drum together with means connected to said shaft adapted to cooperate to guide movement of said shaft in a longitudinal direction; a stylus mounted on said shaft and movable therewith adapted to record on said recording chart; a spring connected to the lower end of said shaft adapted to bias downward movement of said shaft when said float is moved downwardly in said lower tapered portion; and a motor connected to said drum adapted to rotate said drum.

2. Apparatus as recited in claim 1 including a packer means mounted on said housing adapted to direct well fluids through said ports and through said housing past said float.

3. Apparatus as recited in claim 2 including anchoring means connected to said housing adapted to anchor said flow meter in said well bore.

4. Apparatus as recited in claim 3 including an inflatable packer element adapted to seal off the annulus between said well bore wall and said flow meter; and pump means for pumping well fluids into said packer means to inflate said packer means and for permitting said packer means to deflate, said pump means including a piston reciprocal by raising and lowering said non-conductor wire line.

5. Apparatus as recited in claim 4 including a pump cylinder connected to said packer means; a piston arranged in said cylinder and movable between upper and lower positions; said cylinder having a port positioned below the uppermost position of said piston; a hollow piston rod connected to said piston and extending through the upper end of said cylinder; said piston rod having a port located adjacent the upper end thereof fluidly communicating the interior and exterior of said piston rod; a weight section connected to the upper end of said piston rod at its lower end and to said non-conducting wire line at its upper end; a first check valve arranged in said piston adapted to close off upward fluid flow through said piston rod and to permit fluid to flow downwardly through said piston rod and said piston to the underside thereof upon upward movement of said piston rod and piston upwardly; a second check valve arranged in the lower end of said cylinder normally closing off fluid flow from said cylinder to the interior of said packer element and opening upon downward movement of said piston rod and said piston to fluidly communicate the cylinder below said piston and the interior of said packer element; a third valve arranged in the lower end of said cylinder normally preventing flow of fluid from the interior of said packer element into the lower end of said cylinder below said piston, said third valve when open fluidly communicating the cylinder below said piston and the interior of said packer element; a cable connected to said third valve and to the under side of said piston, said cable when under tension opening said third valve whereby movement of said piston rod, weight, and piston upwardly by pulling up on said wire line permits well fluids to flow into said cylinder through the port in said piston rod, said piston rod, piston, and first check valve, said piston not being raised sufficiently far to place said cable in tension thereby maintaining said third valve closed during pumping, said piston rod at the uppermost end of its stroke placing said cable in tension and opening said third valve to fluidly communicate the interior of said packer and the interior of said cylinder to drain fluid from said packer through the port in said cylinder.

References Cited in the file of this patent

UNITED STATES PATENTS

| | | |
|---|---|---|
| 167,994 | Deacon | Sept. 21, 1875 |
| 2,527,929 | Hebard | Oct. 31, 1950 |
| 2,629,446 | Freling et al. | Feb. 24, 1953 |
| 2,783,646 | Rumble | Mar. 5, 1957 |
| 2,779,192 | Rumble et al. | Jan. 29, 1957 |
| 2,829,518 | Rumble et al. | Apr. 8, 1958 |
| 2,942,669 | Mounce et al. | June 28, 1960 |
| 2,954,471 | Piety | Sept. 27, 1960 |
| 3,036,460 | White et al. | May 29, 1962 |
| 3,041,875 | Reesby | July 3, 1962 |
| 3,059,695 | Barry et al. | Oct. 23, 1962 |
| 3,071,687 | Youmans | Jan. 1, 1963 |